United States Patent [19]
Kogure

[11] Patent Number: 5,532,478
[45] Date of Patent: Jul. 2, 1996

[54] UNDERWATER BRANCHING DEVICE

[75] Inventor: Yoshikazu Kogure, Tokyo, Japan

[73] Assignee: NEC Corporation, Tokyo, Japan

[21] Appl. No.: 345,691

[22] Filed: Nov. 21, 1994

[30] Foreign Application Priority Data

Nov. 25, 1993 [JP] Japan ................................. 5-318964

[51] Int. Cl.⁶ ..................................................... H01J 5/16
[52] U.S. Cl. .............................. 250/227.24; 250/227.28; 359/141
[58] Field of Search ..................... 250/227.24, 227.28; 359/141, 173, 176, 179

[56] References Cited

U.S. PATENT DOCUMENTS

| | | | |
|---|---|---|---|
| 4,696,060 | 9/1987 | Oswald | 359/141 |
| 4,727,601 | 2/1988 | Konishi | 359/173 |
| 4,972,513 | 11/1990 | Mochizuki et al. | 359/179 |
| 5,020,152 | 5/1991 | Glista | 359/179 |

*Primary Examiner*—Georgia Y. Epps
*Assistant Examiner*—Jacqueline M. Steady
*Attorney, Agent, or Firm*—Whitham, Curtis, Whitham & McGinn

[57] ABSTRACT

An underwater branching device for branching a plurality of submarine communication cables respectively provided for communication between a plurality of stations respectively located across an ocean. The underwater branching device has a plurality of distributing and coupling unit for branching and coupling transmission signals of the submarine communication cables. A plurality of amplifiers are provided between the distributing and coupling units. A control means is provided for selectively activating the first to third amplifier.

7 Claims, 4 Drawing Sheets

FIG.3

| FAILURE POINT | VOLTAGE POLARITY OF POWER SUPPLY DEVICES | | | SUPPLY CURRENT DIRECTION | TERMINAL VOLTAGE OF ZENER DIODES | | |
|---|---|---|---|---|---|---|---|
| | A STATION | B STATION | C STATION | | $V_1$ | $V_2$ | $V_3$ |
| NORMAL STATE | ⊖ | ⊕ | ⊖ | B → A & GROUND → C | 0 | $\frac{V_0}{2}$ | 0 |
| POINT a | — | ⊖ | ⊕ | C → B | $\frac{V_0}{2}$ | $\frac{V_0}{2}$ | $V_0$ |
| POINT b | ⊖ | — | ⊕ | C → A | 0 | $V_0$ | $\frac{V_0}{2}$ |
| POINT c | ⊕ | ⊖ | — | A → B | $V_0$ | 0 | $\frac{V_0}{2}$ |

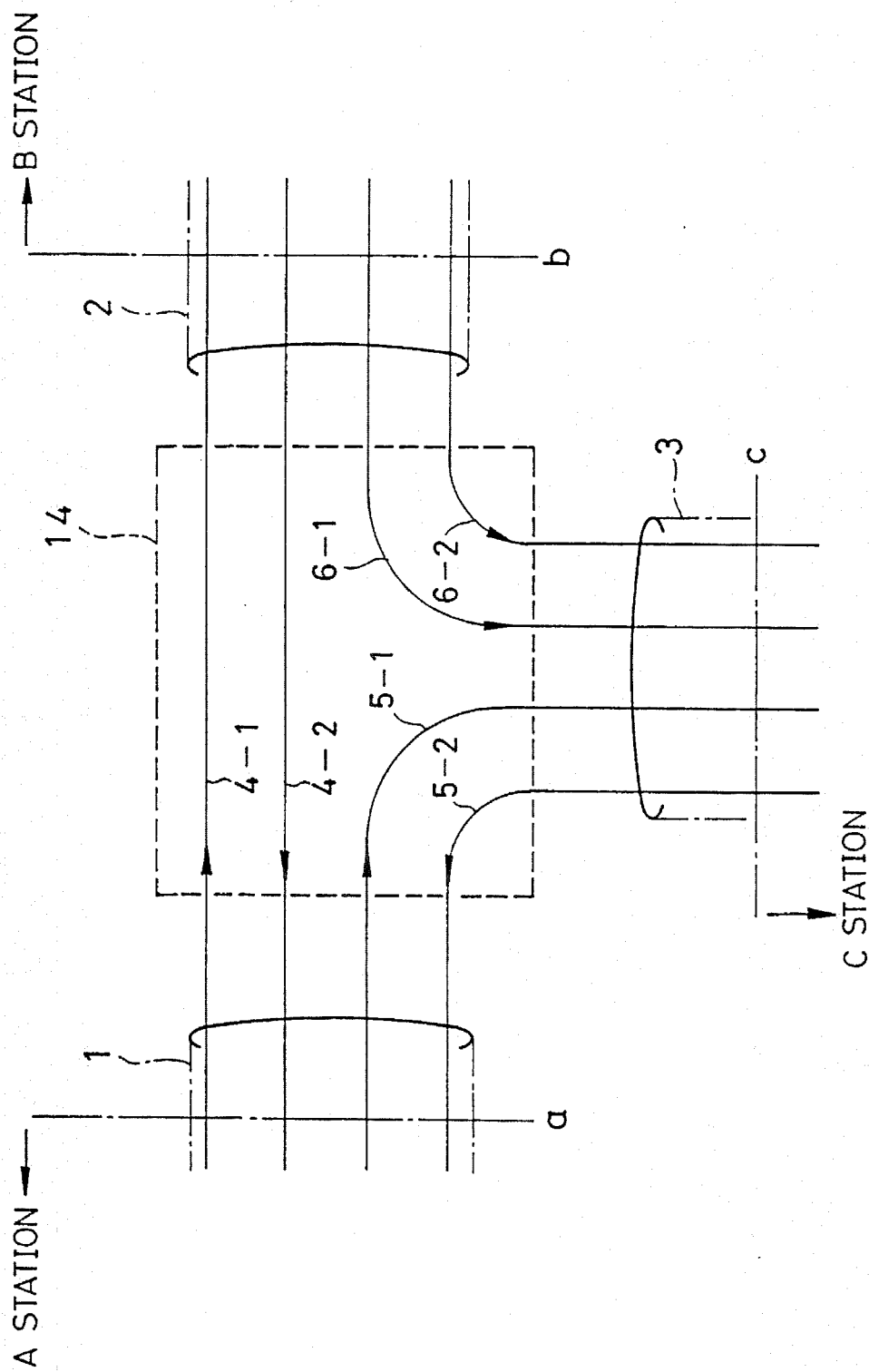

UNDERWATER BRANCHING DEVICE

BACKGROUND OF THE INVENTION

1. Field of the Invention

The present invention relates generally to an underwater branching device. More specifically, the invention relates to an underwater branching device for branching an optical submarine cable under the water.

2. Description of the Related Art

A conventional underwater branching device of this type is partially shown in FIG. 4. In FIG. 4, there is shown an optical submarine cable network in order to perform bidirectional optical communication between first to third stations (A to C stations) respectively located across an ocean. The A to C stations are mutually connected through submarine cables 1 to 3. These submarine cables 1 to 3 are branched for enabling mutual optical communication between respective of A to C stations within a underwater branching device 14 provided under the water.

In further detail, the submarine cable 1 has two pairs of optical fibers (hereinafter simply referred to as "fiber") 4-1, 4-2 and 5-1, 5-2. The submarine cable 2 has two pairs of fibers 4,1 4-2 and 6-1, 6-2. The submarine cable 3 has two pairs of fibers 5-1, 5-2 and 6-1 and 6-2.

A pair fibers 4-1 and 4-2 are employed for up-stream and down-stream communication between the A station and B station, a pair of fibers 5-1 and 5-2 are employed for up-stream and down-stream communication between the C station and the A station, and a pair of fibers 6-1 and 6-2 are employed for up-stream and down-stream communication between the B station and C station.

By the connection as illustrated in FIG. 4, optical communication between three stations, i.e. A to C stations located across the ocean can be performed.

The conventional underwater branching device has no measures for failure caused in the submarine cable or terminal system. The reason will be discussed with reference to FIG. 4.

When cut-off failure of the submarine cable is caused at a point a within the submarine cable, communication through the optical fibers 4-1, 4-2 and 5-1 and 5-2 is interfered. Therefore, the communication path becomes only optical fibers 6-1 and 6-2 connecting the B station and C station.

Similarly, when a failure is caused at a point b within the submarine cable, the communication path becomes only optical fibers 5-1 and 5-2 for only one system connecting the C station and A station. Also, when a failure is caused at a point c within the submarine cable, the communication path becomes only optical fibers 4-1 and 4-2 for only one system connecting the A station and B station. Therefore, in such case, the communication path cannot be used effectively.

If it can be realized in the underwater branching device 14 to connect the optical fiber 5-2 to the optical fiber 4-1 and the optical fiber 4-2 to the optical fiber 5-1, the submarine cables 2 and 3 other than the faulty submarine cable 1 can be effectively used so that one more system can be effectively used in the communication between the B station and C station.

SUMMARY OF THE INVENTION

Therefore, it is an object of the present invention to provide an underwater branching device which enables effective use of submarine cables such that when failure is caused in one of three submarine cables, the remaining two submarine cables can be effectively used.

According to one aspect, an underwater branching device for branching first, second and third submarine communication cables respectively provided for communication between first and second stations, between second and third stations and between third and fist stations respective located across ocean, comprises:

first, second and third distributing and coupling means for branching and coupling transmission signals of the first to third submarine communication cables;

first, second and third amplifier means provided between the first and second distributing and coupling means, between the second and third distributing and coupling means and between the third and first distributing means for amplifying signals between respective of the coupling means; and control means for selectively activating the first to third amplifier means.

According to another aspect of the invention, an underwater branching device for a submarine communication network for communication between stations located across the ocean, comprises:

communication path means for defining a plurality of communication paths respectively connecting two of stations for mutual communication therethrough;

back-up communication path means for defining at least one by-passing path for by-passing one communication path to the other communication path;

switching means associated with the back-up communication path means for switching the latter between operative state, in which the by-passing path is conductive for establishing bypass for the one communication path and inoperative state, in which the by-passing path is held blocked; and ground control means provided on the ground remote from the underwater branching device for normally placing the switching means in the inoperative state and for switching the state of the switching means into the operative state when a failure is caused in the one communication path.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings:

FIG. 3 is an illustration showing a relationship of signal voltages at respective portions for showing the operation of the control portion of FIG. 2; and FIG. 4 is a block diagram showing an example of the conventional underwater branching device.

DESCRIPTION OF THE PREFERRED EMBODIMENT

The present invention will be discussed hereinafter in detail in terms of the preferred embodiment with reference to FIGS. 1 to 3. In the following description, numerous specific details are set forth in order to provide thorough understanding of the present invention. It will be obvious, however, to those skilled in the art that the present invention may be practiced without these specific details. In other instance, well-known structures are not shown in detail in order to unnecessary obscure the present invention.

Figure 1:
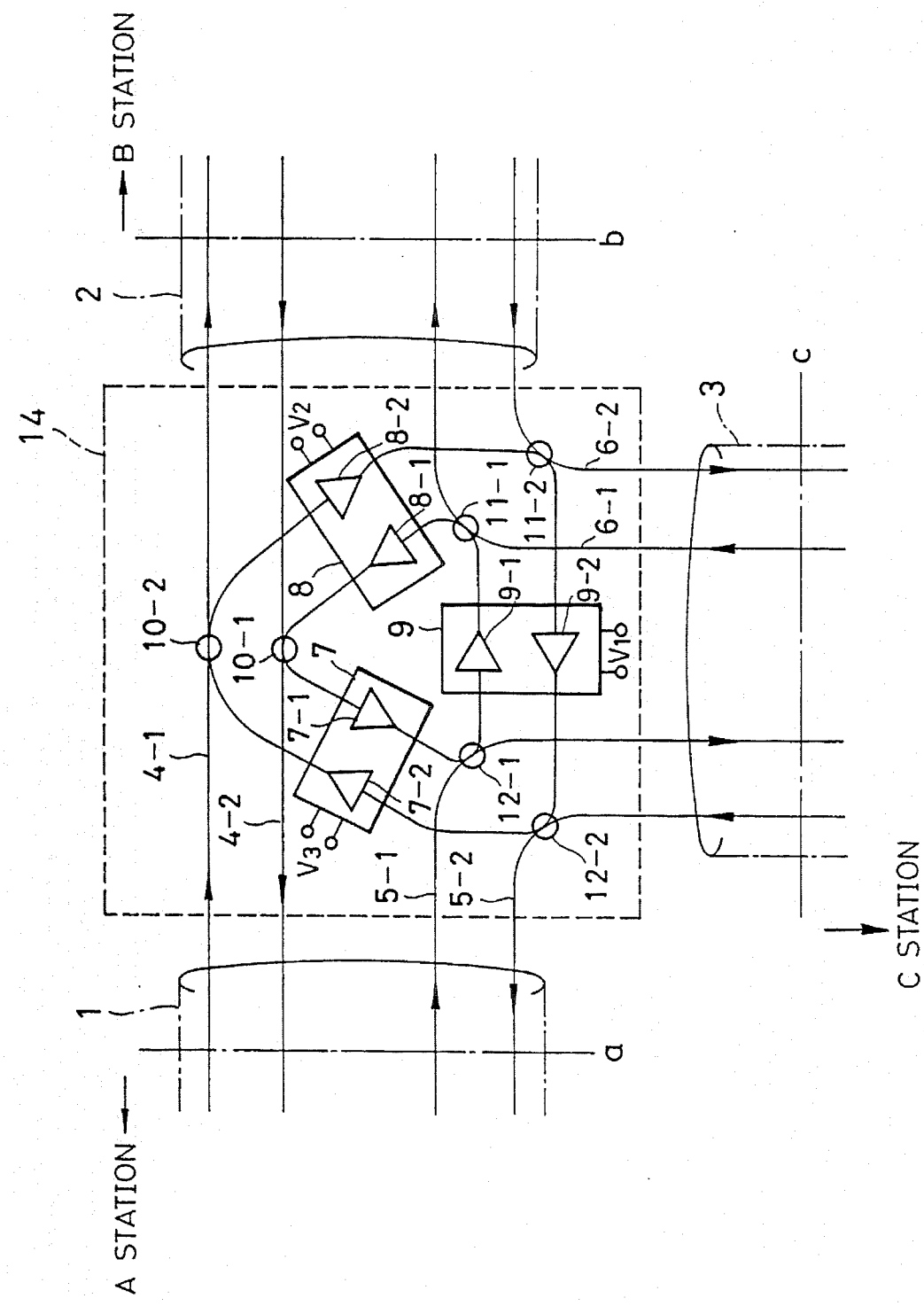
FIG. 1 is a block diagram of the preferred embodiment of an underwater branching device according to the present invention.

FIG. 1 is a block diagram of the preferred embodiment of an underwater branching device according to the present invention. It should be noted that like elements to those of FIG. 4 are identified by like reference numerals. Even in the shown embodiment, there is illustrated the underwater branching device in an optical communication system between A to C stations respective located across the ocean. A submarine cable 1 connected to the A station includes two sets of optical fibers comprising up-stream and down-stream fibers 4-1 and 4-2 for optical communication with the B station and up-stream and down-stream fibers 5-1 and 5-2 for optical communication with the C station.

A submarine cable 2 connected to the B station includes two sets of optical fibers comprising up-stream and down-stream fibers 6-1 and 6-2 for optical communication with the C station and up-stream and down-stream fibers 4-1 and 4-2 for optical communication with the A station.

Also, a submarine cable 3 connected to the C station includes two sets of optical fibers comprising up-stream and down-stream fibers 5-1 and 5-2 for optical communication with the A station and up-stream and down-stream fibers 6-1 and 6-2 for optical communication with the B station.

For respective of these up-stream and down-stream fibers, distributing couplers 10-1, 10-2, 11-1, 11-2 and 12-1, 12-2 for distributingly coupling a part of optical signals are interposed. Between these distributing couplers, light direct amplifiers 7 to 9 for amplifying the optical signals are connected in the shown manner.

The light direct amplifier 7 comprises two amplifiers 7-1 and 7-2. The amplifier 7-1 amplifies branched light from the distributing coupler 10-1 on the fiber 4-2 and inputs to the distributing coupler 12-1 on the fiber 5-1. The amplifier 7-2 amplifies branched light from the distributing coupler 12-2 on the fiber 5-2 and inputs to the distributing coupler 10-2 on the fiber 4-1.

Namely, by two amplifiers 7-1 and 7-2 of the light direct amplifiers 7 and four distributing couplers 10-1, 10-2 and 12-1, 12-2, an optical communication path between the B station and the C station can be newly established. It should be noted that the light direct amplifier 7 is adapted to be activated by external application of an activation control voltage V3.

The light direct amplifier 8 comprises two amplifiers 8-1 and 8-2. The amplifier 8-1 amplifies branched light from the distributing coupler 11-1 on the fiber 6-1 and inputs to the distributing coupler 10-1 on the fiber 4-2. The amplifier 8-2 amplifies branched light from the distributing coupler 10-2 on the fiber 4-1 and inputs to the distributing coupler 11-2 on the fiber 6-2.

Namely, by two amplifiers 8-1 and 8-2 of the light direct amplifiers 8 and four distributing couplers 10-1, 10-2 and 11-1, 11-2, an optical communication path between the C station and the A station can be newly established. It should be noted that the light direct amplifier 8 is also adapted to be activated by external application of an activation control voltage V2.

The light direct amplifier 9 comprises two amplifiers 9-1 and 9-2. The amplifier 9-1 amplifies branched light from the distributing coupler 12-1 on the fiber 5-1 and inputs to the distributing coupler 11-1 on the fiber 6-1. The amplifier 9-2 amplifies branched light from the distributing coupler 11-2 on the fiber 6-2 and inputs to the distributing coupler 12-2 on the fiber 5-2.

Namely, by two amplifiers 9-1 and 9-2 of the light direct amplifiers 9 and four distributing couplers 11-1, 11-2 and 12-1, 12-2, an optical communication path between the A station and the B station can be newly established. It should be noted that the light direct amplifier is adapted to be activated by external application of an activation control voltage V1.

Figure 2:
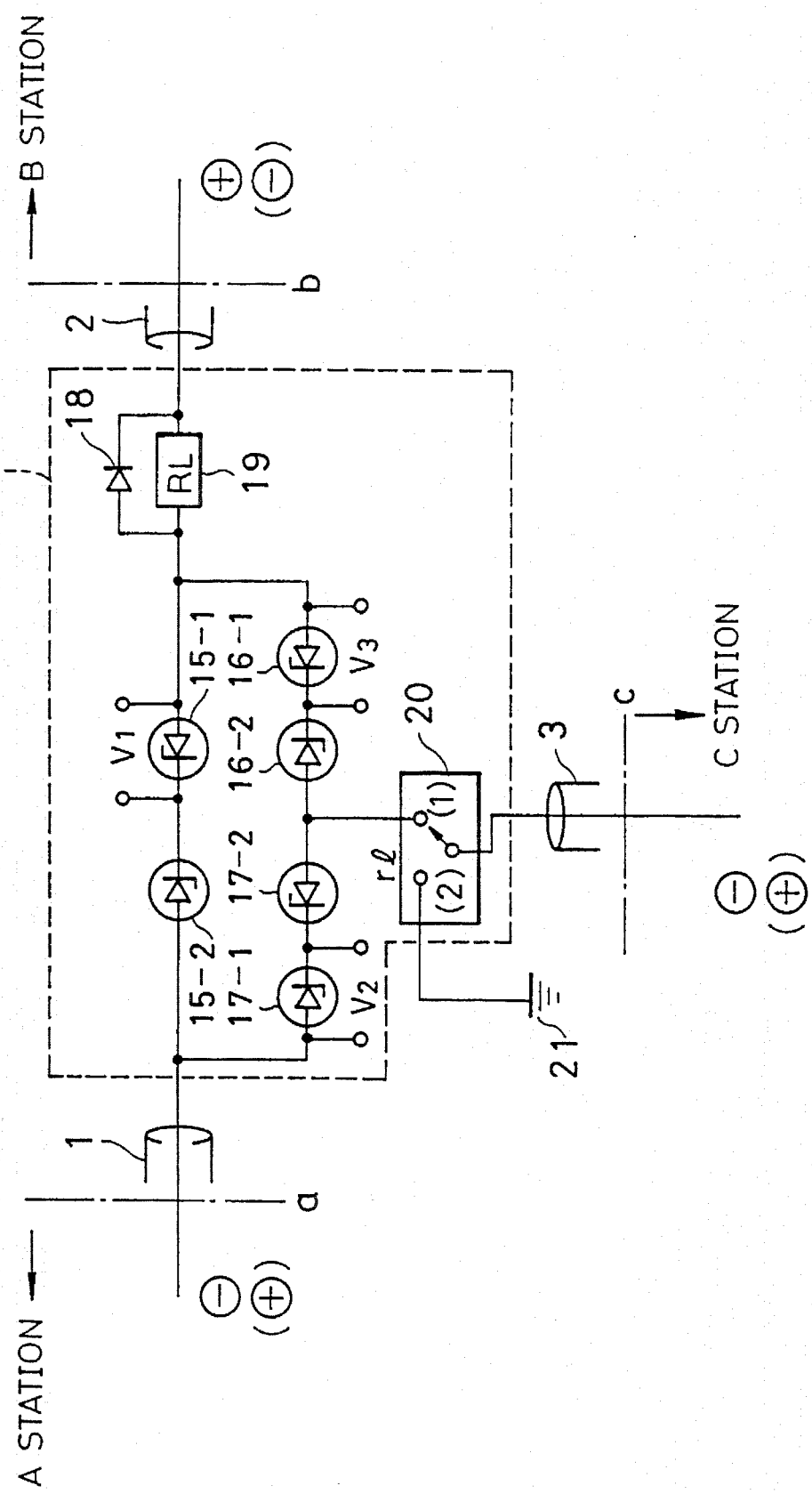
FIG. 2 is a circuit diagram of a control portion for selectively activating light direct amplifiers in the preferred embodiment of the underwater branching device according to the invention.

These activation control voltages V1 to V3 are generated by a circuit shown in FIG. 2 depending upon supply currents from respective of A to C stations to the underwater branching device 14 (the supply currents from unshown power supply devices provided at respective stations).

Referring to FIG. 2, between a power supply line extending from the A station to the underwater branching device 14 via the submarine cable 1 and a power supply line extending from the B station to the underwater branching device 14 via the submarine cable 2, Zener diodes 15-2 and 15-1 and a relay coil 19 are connected in series. Also, a diode 18 is connected in parallel to the diode 19. It should be appreciated that the Zener diodes 15-1 and 15-2 are so connected as to have a common cathode to have mutually opposite polarities.

Between the power supply lines of the B and C stations, the relay coil 19, Zener diodes 16-1 and 16-2 and a relay contact 20 are connected in series. The Zener diodes 16-1 and 16-2 are so connected as to have a common cathode to have mutually opposite polarities.

Similarly, between the power supply lines of the C and A stations, the relay contact 20 and Zener diodes 17-2 and 17-1 are connected in series. The Zener diodes 17-1 and 17-2 are so connected as to have a common cathode to have mutually opposite polarities.

With the construction set forth above, the voltage polarity of the power supply devices of the A, B and C stations are set to be "−" in the A station, "+" in the B station and "−" in the C station, in the normal state, as shown in FIG. 3.

The current flowing from the B station reaches the A station via the cable 2, the relay coil 19, the Zener diodes 15-1 and 15-2 and the cable 1. At this time, the diode 18 have the opposite polarity to the flow of the current, namely to the flow direction of current from the B station side to the A station side. Therefor, all current flows through the relay coil 19. As a result, the relay coil 19 becomes active.

Then, the contact 20 of the relay coil 19 is switched from (1) side to (2) side. Subsequently, by driving the power supply device of "−" polarity in the C station, the supply current for the optical submarine cable 3 reaches the C station through a submarine grounding electrode 21 mounted on the underwater branching device 14. Thus, power supply between the B station having "+" polarity and the A station having "−" polarity, and between the grounding electrode 21 and the C station having "−" polarity are enabled. When optical submarine repeaters are present in the cables 1, 2 and 3, the submarine repeaters can be driven by the supplied power.

Assuming that all of the Zener diodes 15-1, 15-2, 16-1, 16-2, 17-1 and 17-2 have the same characteristics, diodes 15-1 and 16-1 become forward direction relative to the current. Then, the voltage generated at both ends of the diode 15-2 is equally loaded to the diodes 17-1 and 16-2, the voltage at both ends of the diode 17-1 becomes half of the voltage at both ends of the diode 15-2.

Now, when supply current is applied to one Zener diode and assuming the Zener voltage is V0, voltages at both ends of respective Zener diodes 15-1, 16-1 and 17-1 become V1=0, V3=0 and V2=V0/2. At this condition, namely at the condition where no failure is caused in the cables 1, 2 and 3, if V1, V2 and V3 are connected to the light direct amplifier operative at V0 voltage for responding to V1, V2 and V3, all of the light direct amplifiers are held inoperative.

Next, when a failure is caused at the point a in the optical submarine cable 1 to make power supply between the A station and the B station impossible, the polarity of the power supply devices in the B station and C station are modified. Namely, the supplied current flows from the C station and reaches the B station via the relay contact 20, the Zener diodes 16-2 and 16-1, the diode 18 and optical submarine cable 2.

At this time, since all supply current flows through the diode 18, the relay coil 19 is held inoperative, At this time, among the voltages of V1, V2 and V3 becomes V1=V0/2, V2=V0/2 and V3=V0. Therefore, only voltage of Zener diode 16-1 reaches the Zener voltage. At this time, by connecting V1, V2 and V3 to the light direct amplifier operative at V0 as V1, V2 and V3 of FIG. 1, only the light direct amplifier connected to the point V3 becomes active.

When a failure is caused at a point b in the optical submarine cable 2, the polarity of the voltage of the power supply device of the C station is modified to be "+" which is opposite to the polarity of the normal state and the polarity of the voltage of the power supply device of the A station is maintained in normal "−" polarity to perform power supply between the C station and the A station.

In the similar principle to the above, at this time, only Zener diode 17-1 reaches the Zener voltage V0. Namely, at this condition, respective of V1, V2 and V3 become V1=0, V2=V0 and V3=V0/2. At this time, by connecting V1, V2 and V3 to the light direct amplifier operative at V0 as V1, V2 and V3 of FIG. 1, only the light direct amplifier connected to the point V2 becomes active.

When a failure is caused at a point c in the optical submarine cable 3, the polarity of the voltage of A station is set at "+" and the polarity of voltage of the B station is set at "−" polarity to perform power supply between the A station and the B station.

In the similar principle to the above, at this time, only Zener diode 15-1 reaches the Zener voltage V0. Namely, at this condition, respective of V1, V2 and V3 become V1=V0, V2=0 and V3=V0/2. At this time, by connecting V1, V2 and V3 to the light direct amplifier operative at V0 as V1, V2 and V3 of FIG. 1, only the light direct amplifier connected to the point V1 becomes active.

The operation and principle of operation of FIG. 2 is summarized in the table of FIG. 3. In FIG. 3, mark "o" of the voltage polarity of the power supply devices shows active state.

In view of the principle of operation of the power source circuit portion of the underwater branching device, discussion will be given for the embodiment of FIG. 1.

In FIG. 1, when no failure is caused on the optical submarine cables 1, 2 and 3, an optical communication signal fed from the A station reaches the B station via the fiber 4-1, the optical distributing coupler 10-2. Simultaneously, the optical communication signal fed from the B station reaches the A star ion via the optical distributing coupler 10-1 and the fiber 4-2 and to the C station via the optical distributing coupler 11-2 and the fiber 6-2. Also, the optical communication signal fed from the C station reaches the A station via the optical distributing coupler 12-2 and the fiber 5-2 and to the B station via the optical distributing coupler 11-1 and the fiber 6-1.

As can be clear from the foregoing discussion, if no failure is caused in the optical submarine cable, respective power supply terminal voltages V3, V2 and V1 of the light direct amplifiers 7, 8 and 9 cannot reach the operation voltage V0. Therefore, the amplifiers 7, 8 and 9 are held inoperative so that the optical signals may not be propagated through the light direct amplifiers.

When a failure is caused at the point a to make power supply between the A station and B station impossible, the polarity of the power supply device of the C station is set at "+" and the polarity of the power supply device of the B station is set at "−" to perform power supply between the C station and the B station, the operation voltage V0 is applied only to the light direct amplifier 7 to make the amplifier 7 operative. At this time, other optical light amplifiers 8 and 9 are maintained inoperative.

As a result, the optical communication signal fed from the C station is propagated through an optical path reaching the B station through the light distributing coupler 12-2, the light direct amplifier 7-2, the light distributing amplifier 10-2 and through an optical path reaching the B station. On the other hand, the optical communication signal fed from the B station is propagated through an optical path reaching the C station via the light distributing coupler 10-1, the light direct amplifier 7-1 and the light distributing coupler 12-1 and an optical path reaching the C station.

When a failure is caused at the point b, the polarity of the power supply device of the C station is set at "+" and the polarity of the power supply device of the A station is set at "−" to perform power supply. Then, the operation voltage V0 is applied only to the light direct amplifier 8 to make the amplifier 8 operative. As a result, the optical communication signal fed from the C station is propagated through an optical path reaching the A station through the light distributing coupler 11-1, the light direct amplifier 8-1, the light distributing amplifier 10-1 and through an optical path reaching the A station.

On the other hand, the optical communication signal fed from the A station is propagated through an optical path reaching the C station via the light distributing coupler 10-2, the light direct amplifier 8-2 and the light distributing coupler 11-2 and an optical path reaching the C station.

When a failure is caused at the point c, the polarity of the power supply device of the A station is set at "+" and the polarity of the power supply device of the B station is set at "−" to perform power supply. Then, the operation voltage V0 is applied only to the light direct amplifier 9 to make the amplifier operative. As a result, the optical communication signal fed from the A station is propagated through an optical path reaching the B station through the light distributing coupler 12-1, the light direct amplifier 9-1, the light distributing amplifier 11-1 and through an optical path reaching the B station.

On the other hand, the optical communication signal fed from the B station is propagated through an optical path reaching the A station via the light distributing coupler 11-2, the light direct amplifier 9-2 and the light distributing coupler 12-2 and an optical path reaching the A station.

It should be noted that, in order to operate the circuit of the present invention, it becomes necessary to switch the polarity of the power supply device provided for respective terminal stations. However, since the power supply device should have a function for enabling switching the power supply polarity, no problem will arise. Also, since the optical submarine repeater provided at intermediate positions in the optical submarine cable may have a circuit operative irrespective of the direction of power supply, switching of polarity of the power supply will not cause any problem.

As set forth above, the present invention permits mutual communication between three stations located across the ocean and connected through the underwater branching devices maintaining the light direct amplifiers of the submarine cables for optical branching and optical coupling between the optical fibers, inoperative while no failure is caused in three optical cables connecting the three stations across the ocean. On the other hand, when failure is caused in one of three optical cables, all of the possible optical paths of non-faulty remaining two optical submarine cables can be effectively used.

Although the invention has been illustrated and described with respect to exemplary embodiment thereof, it should be understood by those skilled in the art that the foregoing and various other changes, omissions and additions may be made therein and thereto, without departing from the spirit and scope of the present invent ion. Therefore, the present invention should not be understood as limited to the specific embodiment set out above but to include all possible embodiments which can be embodies within a scope encompassed and equivalents thereof with respect to the feature set out in the appended claims.

What is claimed is:

1. An underwater branching device for branching first, second and third submarine communication cables respectively provided for communication between first and second stations, between second and third stations and between third and first stations respectively located across an ocean, comprising:

first, second and third distributing and coupling means for branching and coupling transmission signals of said first, second and third submarine communication cables, respectively;

first, second and third amplifier means provided between said first and second distributing and coupling means, between said second and third distributing and coupling means and between said third and first distributing and coupling means for amplifying signals between respective ones of said distributing and coupling means; and control means for selectively activating said first, second and third amplifier means.

2. An underwater branching device as set forth in claim 1, wherein each of said first, second and third submarine communication cables comprises a pair of cables including an up-stream cable and a down-stream cable, each of said first, second and third distributing and coupling means comprising a pair of up-stream and down-stream distributing couplers for distributing and coupling signals of said pair of cables, and each of said first, second and third amplifier means comprising a pair of up-stream and down-stream amplifiers respectively amplifying signals of the up-stream and down-stream distributing couplers of the corresponding distributing and coupling means.

3. An underwater branching device as set forth in claim 2, wherein said control means selectively activates said first, second and third amplifier means depending upon a combination of polarities of power supply voltages of power supply devices at said first, second and third stations.

4. An underwater branching device as set forth in claim 3, wherein said control means activates said third amplifier means by a power supply voltage from said second station to said third station when a failure is caused in one of said first and third submarine communication cables in a vicinity of said first station.

5. An underwater branching device as set forth in claim 3, wherein said control means activates said second amplifier means by a power supply voltage from said third station to said first station when a failure is caused in one of said first and second submarine communication cables in a vicinity of said second station.

6. An underwater branching device as set forth in claim 3, wherein said control means activates said first amplifier means by a power supply voltage from said first station to said second station when a failure is caused in one of said second and third submarine communication cables in a vicinity of said third station.

7. An underwater branching device as set forth in claim 3, wherein said first, second and third submarine communication cables each comprise optical submarine cables, said first, second and third distributing and coupling means each comprise optical distributing and coupling means, and said first, second and third amplifier means each comprise optical amplifier means.

* * * * *